United States Patent [19]

Kanayama

[11] Patent Number: 4,498,088

[45] Date of Patent: Feb. 5, 1985

[54] INK JET AIR BUBBLE DETECTION

[75] Inventor: Yoshio Kanayama, Nabari, Japan

[73] Assignee: Sharp Kabushiki Kaisha, Osaka, Japan

[21] Appl. No.: 400,925

[22] Filed: Jul. 22, 1982

[30] Foreign Application Priority Data

Jul. 28, 1981 [JP] Japan ............................... 56-118762

[51] Int. Cl.[3] ............................................ G01D 15/18

[52] U.S. Cl. ................................. 346/140 R; 364/518

[58] Field of Search .............. 346/140 R, 75; 364/518

[56] References Cited

U.S. PATENT DOCUMENTS 4,241,406 12/1980 Kennedy et al. ............... 364/518 X 4,296,417 10/1981 Markham et al. .................... 346/75

*Primary Examiner*—E. A. Goldberg

*Assistant Examiner*—Gerald E. Preston

*Attorney, Agent, or Firm*—Birch, Stewart, Kolasch & Birch

[57] ABSTRACT

An air bubble detection system is provided for detecting air bubbles contained in an ink liquid disposed in a printer head of an ink jet system printer of the ink on demand type. The air bubble detection system includes a driver circuit for activating a piezoelectric transducer attached to a pressure chamber, thereby creating an initial oscillation in the ink liquid. The air bubble detection system further includes a sensing circuit for sensing a residual oscillation of the ink liquid after termination of the initial oscillation. When air bubbles are contained in the ink liquid, a high frequency component is included in an output signal obtained by the sensing circuit.

4 Claims, 14 Drawing Figures

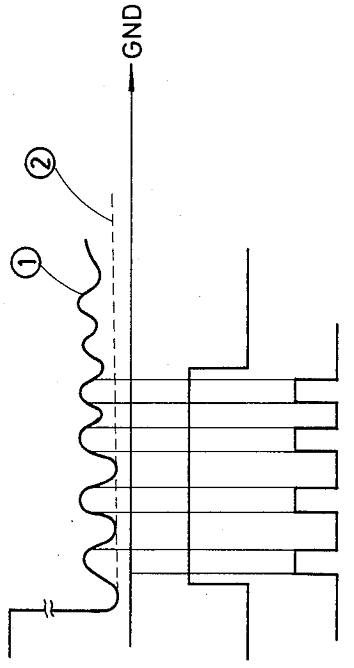
FIG. 8(A)
FIG. 8(B)
FIG. 8(C)
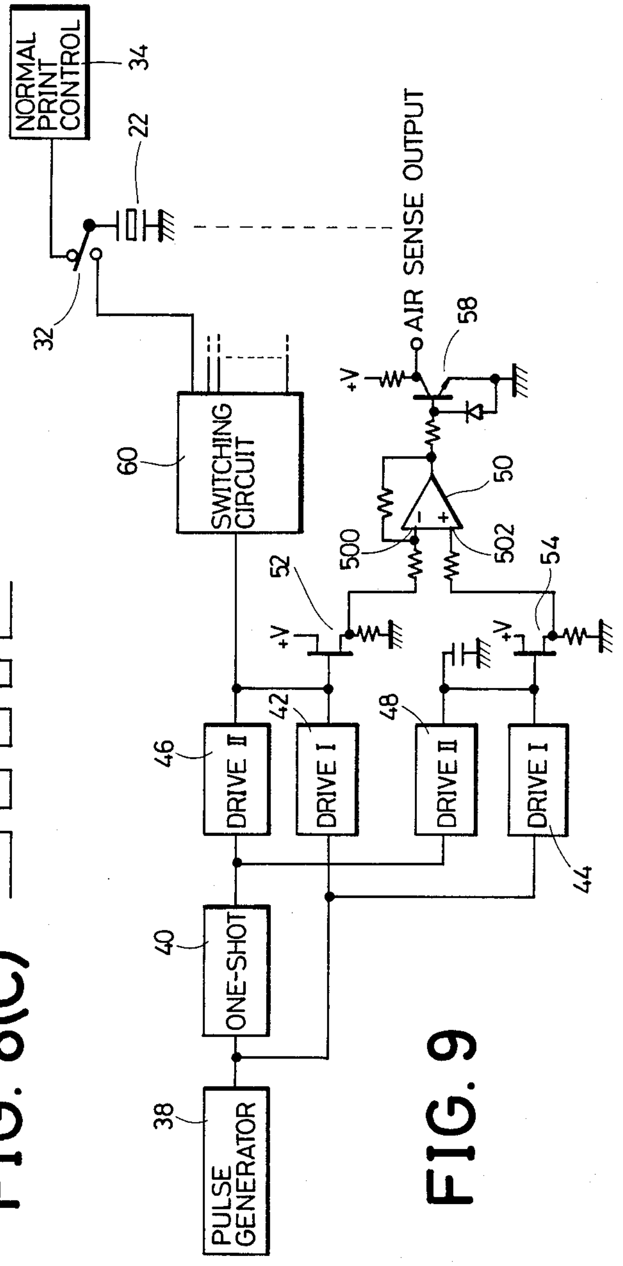
FIG. 9

INK JET AIR BUBBLE DETECTION

BACKGROUND AND SUMMARY OF THE INVENTION

The present invention relates to an ink jet system printer and, more particularly, to a printer head in an ink jet system printer of the ink on demand type.

Recently, an ink jet system printer of the ink on demand type has been developed, wherein ink droplets are emitted from a printer head at a desired time. In such an ink jet system printer of the ink on demand type, there is a problem that a nozzle orifice may become blocked and the ink droplets will not be emitted from the printer head, or undesirable air bubbles may be contained in an ink liquid filled in the printer head. The orifice blocking problem may be solved by providing an orifice cleaning system in the printer head. However, the air bubble problem has not yet been solved.

The above-mentioned air bubbles may be contained in the ink liquid filled in the printer head due to, for example, the incomplete sealing of the printer head. When such air bubbles are contained in the ink liquid filled in the printer head, the vibration energy supplied from a piezoelectric transducer attached to the pressure chamber is absorbed by the air bubbles. Thus, accurate droplet formation is precluded.

Accordingly, an object of the present invention is to provide a novel printer head system which ensures an accurate droplet formation in an ink jet system printer of the ink on demand type.

Another object of the present invention is to provide an air bubble detection system for detecting air bubbles contained in a printer head of an ink jet system printer of the ink on demand type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an air bubble detection system is provided for detecting the existance of air bubbles in an ink liquid disposed in a pressure chamber of the printer head. The air bubble detection system includes a drive source for activating a piezoelectric transducer attached to the pressure chamber for providing an initial oscillation in the ink liquid, and sensing circuit for detecting residual oscillation in the ink liquid disposed in the printer head. When the air bubbles are contained in the ink liquid, high frequency components are included in a signal obtained by the sensing circuit. In a preferred form, the piezoelectric transducer attached to the pressure chamber functions as an oscillator element when the initial oscillation is applied to the ink liquid, and functions as a sensor element when the application of the initial oscillation is terminated.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 8(A), 8(B) and 8(C) are waveform charts for explaining an operational mode of the air bubble detection system of FIG. 4; and FIG. 9 is a circuit diagram of another embodiment of an air bubble detection system in accordance with the present invention.

DESCRIPTION OF THE PREFERRED EMBODIMENTS

Figure 1:
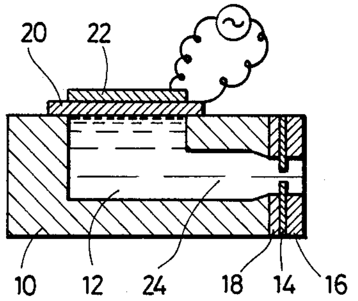
FIG. 1 is a schematic sectional view of a printer head of an ink jet system printer of the ink on demand type.

FIG. 1 schematically shows a basic construction of a printer head in an ink jet system printer of the ink on demand type. The printer head includes a housing 10 for defining a pressure chamber 12. At the one end of the pressure chamber 12, an orifice plate 14 is provided, which is sandwiched between a slit plate 16 and a path plate 18. At the other end of the pressure chamber 12, an oscillation plate 20 is disposed, to which a piezoelectric transducer 22 is attached. A pulse voltage signal is applied to the piezoelectric transducer 22 in order to rapidly reduce the volume of the pressure chamber 12, whereby a portion of the ink liquid contained in the pressure chamber 12 is emitted from the printer head through a passage 24, the path plate 18, the orifice plate 14 and the slit plate 16. The thus emitted ink liquid travels toward a recording paper as an ink droplet, thereby recording a desired symbol on an recording paper.

A typical construction of the ink jet system printer of the ink on demand type is disclosed in U.S. Pat. No. 3,747,120, "ARRANGEMENT OF WRITING MECHANISMS FOR WRINTING ON PAPER WITH A COLORED LIQUID", issued July 17, 1973. Another example of the ink jet system printer of an ink on demand type is disclosed in U.S. Pat. No. 3,946,398, "METHOD AND APPARATUS FOR RECORDING WITH WRITING FLUIDS AND DROP PROJECTION MEANS THEREFOR", issued Mar. 23, 1976.

As already discussed above, when air bubbles are contained in the ink liquid disposed in the printer head, an accurate droplet formation is not ensured. The present invention provides a detection system for checking whether the air bubbles are contained in the ink liquid disposed in the pressure chamber of the printer head.

Figure 2:
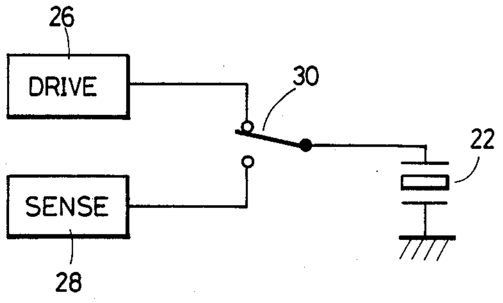
FIG. 2 is a schematic block diagram showing in accordance with an air bubble detection system of the present invention.

FIG. 2 schematically shows an air bubble detection system according to the present invention.

The piezoelectric transducer 22 is connected either to a detection driver circuit 26 or to a sensing circuit 28 via a switching element 30. In order to check for the existance of air bubbles, the detection driver circuit 26 is first connected to the piezoelectric transducer 22 via the switching element 30, thereby applying an initial oscillation to the piezoelectric transducer 22. The voltage level applied to transducer 22 should be selected at a value which does not effect the issuance of the ink droplet from the printer head. Then, the switching element 30 is switched to connect the piezoelectric transducer 22 with the sensing circuit 28. The piezoelectric transducer 22 functions as a sensing element for sensing a residual oscillation of the ink liquid contained in the pressure chamber 12. The frequency of the residual oscillation is about 50 KHz and the residual oscillation is amplified through the use of a differential amplifier.

Figure 3A:
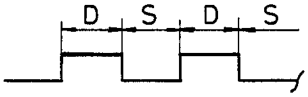
FIGS. 3(A) and 3(B) are waveform charts for explaining an operational mode of the air bubble detection system of FIG. 2.
Figure 3B:
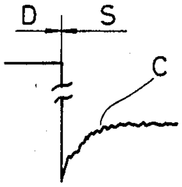

The operation is conducted in a manner as shown in FIG. 3(A). That is, during a drive period D, the detection driver circuit 26 is connected to the piezoelectric transducer 22 for effecting the initial oscillation. During a sensing period S, the sensing circuit 28 is connected to the piezoelectric transducer 22 for sensing the residual oscillation caused by the initial oscillation. FIG. 3(B) is an enlarged view showing the sensing period S. When the air bubbles are contained in the ink liquid, a high frequency component C appears in a detection output.

Figure 4:
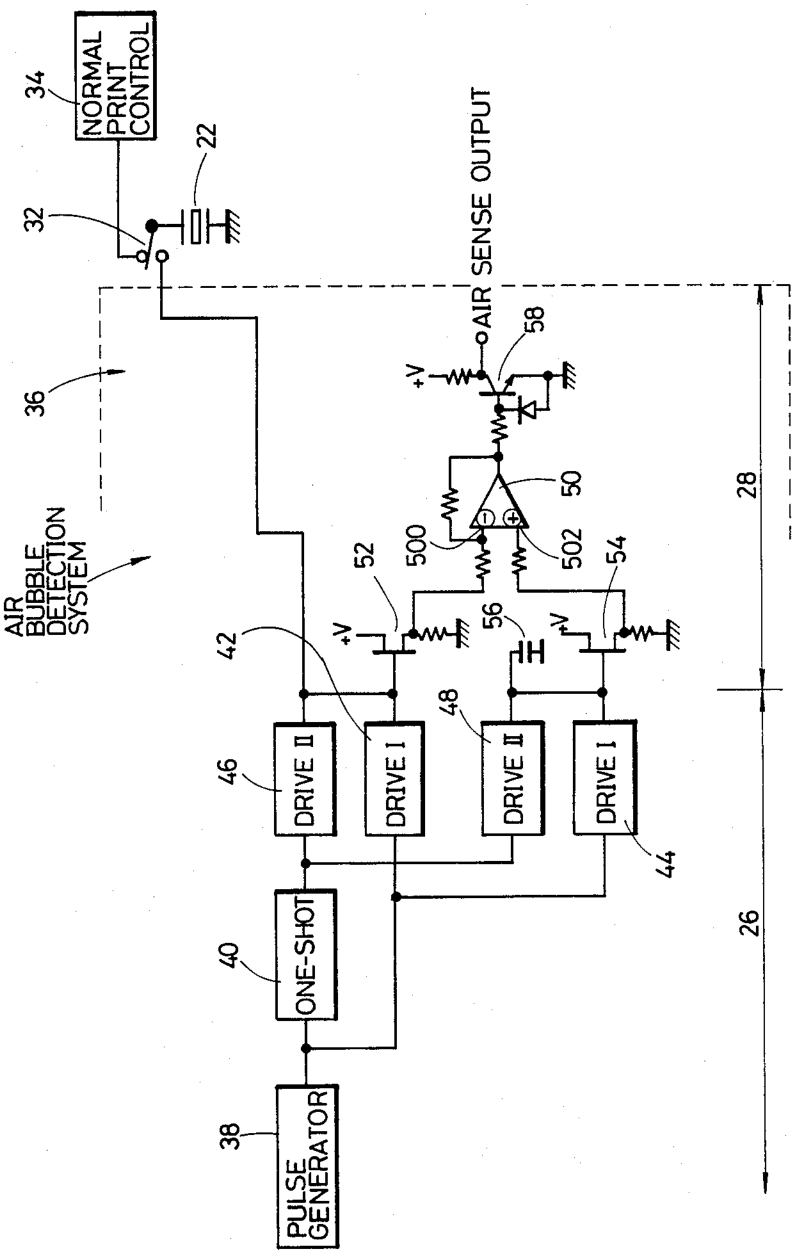
FIG. 4 is a circuit diagram of an embodiment of an air bubble detection system of the present invention.

FIG. 4 shows an embodiment of an air bubble detection system of the present invention. A mode selection switch 32 is provided for selectively connecting the piezoelectric transducer 22 to a normal printing control signal generation circuit 34 and an air bubble detection system 36 of the present invention.

The air bubble detection system 36 includes a pulse generator 38 and a one-shot circuit 40 which develops one pulse in response to the trailing edge of an output signal of the pulse generator 38. The pulse signal developed from the pulse generator 38 is applied to first driver circuits 42 and 44. The pulse signal developed from the one-shot circuit 40 is applied to second driver circuits 46 and 48. The pulse generator 38, the one-shot circuit 40 and the driver circuits 42, 44, 46 and 48 function, in combination, as the detection driver circuit 26 shown in FIG. 2.

The sensing circuit 28 included in the air bubble detection system 36 comprises a differential amplifier 50. The differential amplifier 50 includes a negative input terminal 500 connected to a field effect mode transistor 52, and a positive input terminal 502 connected to another field effect mode transistor 54. A simulation capacitor 56 is provided which has the capacitance corresponding to the output level developed from the piezoelectric transducer 22 in the bubble detection mode when the air bubbles are not contained in the ink liquid disposed in the pressure chamber. An output terminal of the differential amplifier 50 is connected to an output transistor 58.

Figure 5:
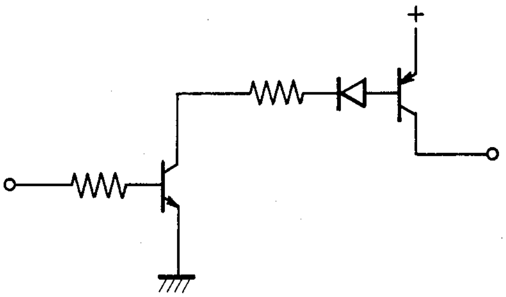
FIG. 5 is a circuit diagram of a first driver circuit included in the air bubble detection system of FIG. 4.

In the bubble detection mode, a predetermined number of pulses are developed from the pulse generator 38. The thus developed pulses are applied to the one-shot circuit 40 and the first driver circuits 42 and 44. FIG. 5 shows the construction of the first driver circuits 42 and 44. When the pulse is applied to the first driver circuit 42, the first driver circuit 42 develops a drive signal to activate the piezoelectric transducer 22, thereby creating the initial oscillation. When the pulse is applied to the first driver circuit 44, the driver circuit 44 functions to charge the simulation capacitor 56 to a preselected level. As already discussed above, the voltage level applied from the first driver circuit 42 to the piezoelectric transducer 22 is selected so that the ink droplet is not emitted from the printer head.

Figure 6:
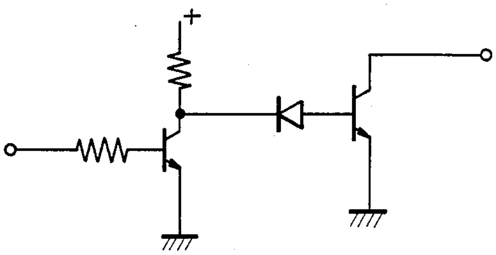
FIG. 6 is a circuit diagram of a second driver circuit included in the air bubble detection system of FIG. 4.

In this way, the initial oscillation is developed. Then, the pulse generator 38 terminates the development of the pulse. In response to the trailing edge of the pulse signal developed from the pulse generator 38, the one-shot circuit 40 develops one pulse of a predetermined pulse length, which is applied to the second driver circuits 46 and 48. FIG. 6 shows the construction of the second driver circuits 46 and 48. The second driver circuits 46 and 48 function to cut-off the sensed output signal obtained from the piezoelectric transducer 22 for a preselected period of time immediately after termination of the initial oscillation, namely during the transient period after the initial oscillation drive, thereby minimizing the noise component included in the sensed output. Furthermore, this cut-off operation functions to discharge the charge amount caused by the capacitance characteristics of the piezoelectric transducer 22.

Figure 7A:
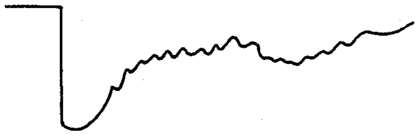
FIGS. 7(A), 7(B) and 7(C) are waveform charts of voltage signals which occur in the air bubble detection system of FIG. 4.
Figure 7B:
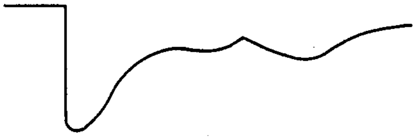
Figure 7C:

When the one pulse developed from the one-shot circuit 40 disappears, the driver circuits 42, 44, 46 and 48 terminate their operations, and the system is placed in the sensing mode, wherein the residual oscillation is sensed through the use of the piezoelectric transducer 22. A signal representing the residual oscillation is applied from the piezoelectric transducer 22 to the negative input terminal 500 of the differential amplifier 50 via the field effect mode transistor 52. The positive input terminal 502 of the differential amplifier 50 is connected to receive the discharge signal of the simulation capacitor 56 via the field effect mode transistor 54. FIG. 7(A) shows an example of the input signal applied to the negative input terminal 500 of the differential amplifier 50. FIG. 7(B) shows an example of the input signal applied to the positive input terminal 502 of the differential amplifier 50. FIG. 7(C) shows an example of an output signal developed from the differential amplifier 50. The output signal of the differential amplifier 50 is applied to the output transistor 58.

Since the oscillation immediately after the initial oscillation is considerably large as shown in FIG. 8(A) (curve 1), the residual oscillation is obtained as a clock signal as shown in FIG. 8(C) when a gate signal shown in FIG. 8(B) is used. The curve 2 in FIG. 8(A) shows a condition where the air bubbles are not contained in the ink liquid disposed in the pressure chamber.

The thus obtained air bubble detection output is applied to an air removing control system which functions to remove the air bubbles contained in the pressure chamber. An example of the air removing control system is disclosed in U.S. patent application Ser. No. 400,930 filed on July 22, 1982.

As is well known, the ink jet system printer of the ink on demand type is preferably constructed in the multi-nozzle type. FIG. 9 shows another embodiment of the air bubble detection system of the present invention, which is suited for the multi-nozzle type. Like elements corresponding to those of FIG. 4 are indicated by like numerals.

A plurality of piezoelectric transducers 22 are provided for the respective nozzles. A switching circuit 60 is provided for sequentially connecting the air bubble detection system to the respective piezoelectric transducers 22.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an ink jet system printer of the ink on demand type which includes a printer head comprising a pressure chamber of which one end is provided with an orifice means for emitting ink droplets therethrough, and the other end is connected to an electro-mechanical transducer for suddenly reducing the volume of the pressure chamber for producing droplets, the improvement comprising:

an air bubble detection system for detecting air bubbles contained in ink liquid disposed in said pressure chamber, said air bubble detection system comprising;

drive means for activating said electro-mechanical transducer for creating an initial oscillation in said ink liquid disposed in said pressure chamber;

sensing means for sensing a residual oscillation of said ink liquid after termination of said initial oscillation and for providing an output signal indicating said residual oscillation; and amplifier means for amplifying said output signal developed from said sensing means.

2. The ink jet system printer of the ink on demand type of claim 1, wherein said electro-mechanical transucer comprises a piezoelectric transducer.

3. The ink jet system printer of the ink on demand type of claim 1, wherein said electro-mechanical transducer comprises a piezoelectric transducer, wherein said piezoelectric transducer also serves as a sensor element of said sensing means for sensing said residual oscillation.

4. The ink jet system printer of the ink on demand type of claim 1, further comprising a print control circuit, and switching means for connecting said piezoelectric transducer selectively to said print control circuit or said air bubble detection system.

* * * * *